(12) United States Patent
Ach et al.

(10) Patent No.: US 10,369,636 B2
(45) Date of Patent: Aug. 6, 2019

(54) MACHINING TOOL AND METHOD FOR MANUFACTURING A MACHINING TOOL

(71) Applicant: Kennametal Inc., Latrobe, PA (US)

(72) Inventors: Eduard Ach, Mossbach (DE); Christoph Gey, Zirndorf (DE)

(73) Assignee: KENNAMETAL INC., Latrobe, PA (US)

( * ) Notice: Subject to any disclaimer, the term of this patent is extended or adjusted under 35 U.S.C. 154(b) by 169 days.

(21) Appl. No.: 14/676,567

(22) Filed: Apr. 1, 2015

(65) Prior Publication Data

US 2015/0298221 A1 Oct. 22, 2015

(30) Foreign Application Priority Data

Apr. 17, 2014 (DE) .................. 10 2014 207 510

(51) Int. Cl.
*B23B 51/06* (2006.01)
*B23C 5/28* (2006.01)

(52) U.S. Cl.
CPC ............... *B23B 51/06* (2013.01); *B23C 5/28* (2013.01); *B23B 2251/02* (2013.01); *B23C 2210/03* (2013.01)

(58) Field of Classification Search
CPC .......... B23B 27/10; B23B 51/06; B23C 5/28; B23C 2250/12
See application file for complete search history.

(56) References Cited

U.S. PATENT DOCUMENTS

| | | |
|---|---|---|
| 385,088 A | 6/1888 | Benzie |
| 864,756 A | 8/1907 | Phillips |
| 1,476,019 A | 12/1923 | Lowry |
| 1,781,863 A | 11/1930 | Shoemaker |
| 1,951,856 A | 3/1934 | Balke |
| 1,965,950 A | 7/1934 | Walker |
| 2,289,065 A | 7/1942 | Oliver |
| 2,289,344 A | 7/1942 | Cedarleaf |
| 2,682,414 A | 6/1954 | Richardson |
| 3,455,000 A * | 7/1969 | Flaherty ................. B23B 27/10 407/118 |
| 3,646,679 A | 3/1972 | Naugle |

(Continued)

FOREIGN PATENT DOCUMENTS

| | | |
|---|---|---|
| CA | 2405109 | 1/2006 |
| CN | 10141897 A | 5/1990 |

(Continued)

OTHER PUBLICATIONS

Beij, K. Hilding, Pressure Losses for Fluid Flow in 90 Degree Pipe Bends, Jul. 1938, National Bureau of Standards, Research Paper RP 1110.*

(Continued)

*Primary Examiner* — Alan Snyder
(74) *Attorney, Agent, or Firm* — Matthew S. Bedsole

(57) ABSTRACT

A machining tool, in the area of a tool tip, includes an integrated cooling structure for transporting a coolant. The cooling structure is optionally or in combination designed as a porous structure or at least one cooling channel having a bent reversing segment, so that two channel segments are oriented in opposite directions. The cooling structure is integrated into a base body of a carrier tool. According to a method of the invention, the cooling structure is manufactured by means of a 3D printing method.

7 Claims, 3 Drawing Sheets

(56) References Cited

U.S. PATENT DOCUMENTS

| | | | |
|---|---|---|---|
| 3,654,681 A | 4/1972 | Stein | |
| 3,705,447 A | 12/1972 | Kollar | |
| 3,754,309 A | 8/1973 | Jones | |
| 3,857,305 A | 12/1974 | Lichtman | |
| 3,911,543 A | 10/1975 | Sorice | |
| 4,229,640 A | 10/1980 | Castellani | |
| 4,373,518 A | 2/1983 | Kaiser | |
| 4,459,458 A | 7/1984 | Vetsch | |
| 4,481,016 A | 11/1984 | Campbell | |
| 4,505,626 A | 3/1985 | Benhase | |
| 4,591,302 A | 5/1986 | Lovendahl | |
| 4,714,385 A | 12/1987 | Komanduri | |
| 4,725,171 A | 2/1988 | DeTorre | |
| 4,728,231 A | 3/1988 | Kunimori | |
| 4,749,618 A | 6/1988 | Kawaguchi | |
| 4,755,237 A | 7/1988 | Lemelson | |
| 4,797,138 A | 1/1989 | Komanduri | |
| 4,826,364 A | 5/1989 | Grunsky | |
| 4,844,668 A | 7/1989 | Pettersson | |
| 4,849,602 A | 7/1989 | Gardner | |
| D305,498 S | 1/1990 | Lassiter | |
| 4,898,499 A | 2/1990 | Tsujimura | |
| 4,946,319 A | 8/1990 | Lyon | |
| 4,987,800 A | 1/1991 | Gasan | |
| 5,022,801 A | 6/1991 | Anthony | |
| 5,026,960 A | 6/1991 | Slutz | |
| 5,066,170 A | 11/1991 | Berryer | |
| 5,078,551 A | 1/1992 | Oomen | |
| 5,098,232 A | 3/1992 | Benson | |
| 5,160,824 A | 11/1992 | Babel | |
| 5,178,645 A | 1/1993 | Nakamura | |
| 5,181,321 A | 1/1993 | Gouttebarge | |
| 5,205,680 A | 4/1993 | Lindstedt | |
| 5,239,160 A | 8/1993 | Sakura | |
| 5,247,923 A | 9/1993 | Lebourg | |
| 5,272,940 A | 12/1993 | Diskin | |
| 5,342,151 A | 8/1994 | Friedmann | |
| 5,362,183 A | 11/1994 | Alario | |
| 5,387,776 A | 2/1995 | Preiser | |
| 5,388,484 A | 2/1995 | Bogner | |
| 5,433,280 A | 7/1995 | Smith | |
| 5,488,761 A | 2/1996 | Leone | |
| 5,634,933 A | 6/1997 | McCombs | |
| 5,643,523 A | 7/1997 | Simpson | |
| 5,685,671 A | 11/1997 | Packer | |
| 5,722,803 A | 3/1998 | Battaglia | |
| 5,776,355 A | 7/1998 | Martin | |
| 5,799,553 A * | 9/1998 | Billatos | B23B 27/10 |
| | | | 407/11 |
| 5,820,313 A | 10/1998 | Weber | |
| 5,851,465 A | 12/1998 | Bredt | |
| 5,853,268 A | 12/1998 | Simpson | |
| 5,906,053 A | 5/1999 | Turner | |
| 5,957,006 A | 9/1999 | Smith | |
| 6,030,156 A | 2/2000 | Andronica | |
| 6,045,301 A * | 4/2000 | Kammermeier | B23B 51/06 |
| | | | 408/230 |
| 6,053,669 A * | 4/2000 | Lagerberg | B23B 27/10 |
| | | | 407/11 |
| 6,062,753 A | 5/2000 | Hadtke | |
| 6,116,823 A | 9/2000 | Mihic | |
| 6,116,825 A | 9/2000 | Kammermeier | |
| 6,146,476 A | 11/2000 | Boyer | |
| 6,161,990 A | 12/2000 | Oles | |
| 6,200,514 B1 | 3/2001 | Meister | |
| 6,274,206 B1 | 8/2001 | Turchan et al. | |
| 6,315,502 B1 | 11/2001 | Maurer | |
| 6,315,505 B1 | 11/2001 | Moore | |
| 6,353,204 B1 | 3/2002 | Spaay | |
| 6,353,205 B1 | 3/2002 | Izard | |
| 6,354,361 B1 | 3/2002 | Sachs et al. | |
| 6,394,466 B1 | 5/2002 | Matsumoto | |
| 6,402,438 B1 | 6/2002 | Boyer | |
| 6,413,286 B1 | 7/2002 | Swei et al. | |
| 6,447,560 B2 | 9/2002 | Jensen | |
| 6,454,030 B1 | 9/2002 | Findley et al. | |
| 6,472,029 B1 | 10/2002 | Skszek | |
| 6,521,864 B2 | 2/2003 | Bertez | |
| 6,524,036 B1 | 2/2003 | Koelker | |
| 6,526,327 B2 | 2/2003 | Kar et al. | |
| 6,554,010 B1 | 4/2003 | Hirose | |
| 6,581,671 B2 | 6/2003 | Butcher et al. | |
| 6,607,533 B2 | 8/2003 | Del Rio | |
| 6,612,204 B1 | 9/2003 | Droese | |
| 6,629,559 B2 | 10/2003 | Sachs et al. | |
| 6,655,481 B2 | 12/2003 | Findley et al. | |
| 6,692,199 B2 | 2/2004 | Andersson | |
| 6,712,564 B1 | 3/2004 | Hughes | |
| 6,715,968 B1 | 4/2004 | Taegstroem | |
| 6,733,603 B1 | 5/2004 | Wu | |
| 6,776,219 B1 | 8/2004 | Cornie et al. | |
| 6,808,340 B2 | 10/2004 | Travez | |
| 6,814,926 B2 | 11/2004 | Geving et al. | |
| 6,859,681 B1 | 2/2005 | Alexander | |
| 6,929,426 B2 | 8/2005 | Thiele | |
| 7,002,100 B2 | 2/2006 | Wu | |
| 7,112,020 B2 | 9/2006 | Sheffler | |
| 7,179,023 B2 | 2/2007 | Goudemond | |
| 7,186,369 B1 | 3/2007 | Hardro et al. | |
| 7,189,032 B2 | 3/2007 | Goudemond | |
| 7,226,254 B2 | 6/2007 | Friedrichs | |
| 7,255,821 B2 | 8/2007 | Priedeman, Jr. et al. | |
| 7,258,720 B2 | 8/2007 | Fuwa et al. | |
| 7,313,991 B2 | 1/2008 | Penkert | |
| 7,322,776 B2 | 1/2008 | Webb | |
| 7,432,471 B2 | 10/2008 | Yamazaki | |
| 7,461,684 B2 | 12/2008 | Liu et al. | |
| 7,476,067 B2 * | 1/2009 | Borschert | B23B 51/06 |
| | | | 408/230 |
| 7,496,424 B2 | 2/2009 | Froeschner et al. | |
| 7,533,713 B2 | 5/2009 | Pfeifer et al. | |
| 7,614,831 B2 | 11/2009 | Liu | |
| 7,634,957 B2 * | 12/2009 | Ghosh | B23B 27/10 |
| | | | 82/1.11 |
| 7,785,046 B2 | 8/2010 | Beckington | |
| 7,832,456 B2 | 11/2010 | Calnan et al. | |
| 7,832,457 B2 | 11/2010 | Calnan et al. | |
| 7,930,054 B2 | 4/2011 | Slaughter et al. | |
| 8,052,765 B2 | 11/2011 | Cho et al. | |
| 8,109,350 B2 | 2/2012 | Fang et al. | |
| 8,178,033 B2 | 5/2012 | Dietrich et al. | |
| 8,221,858 B2 | 7/2012 | Mannella et al. | |
| 8,308,403 B2 | 11/2012 | Hecht | |
| 8,318,076 B2 | 11/2012 | Wang et al. | |
| 8,333,814 B2 | 12/2012 | Brackin et al. | |
| 8,383,028 B2 | 2/2013 | Lyons | |
| 8,398,396 B2 | 3/2013 | Taormina | |
| 8,460,755 B2 | 6/2013 | Rodgers | |
| 8,509,933 B2 | 8/2013 | Steingart et al. | |
| 8,522,646 B2 | 9/2013 | Laird et al. | |
| 8,534,963 B2 | 9/2013 | Luik | |
| 8,551,395 B2 | 10/2013 | Belhadjhamida et al. | |
| 8,568,649 B1 | 10/2013 | Balistreri et al. | |
| 8,746,703 B2 | 6/2014 | Xu | |
| 2001/0056309 A1 | 12/2001 | Jain et al. | |
| 2003/0094730 A1 | 5/2003 | Dourfaye et al. | |
| 2003/0118412 A1 | 6/2003 | Fukui | |
| 2003/0210963 A1 | 11/2003 | Kakai | |
| 2004/0107019 A1 | 6/2004 | Keshavmurthy et al. | |
| 2004/0120777 A1 | 6/2004 | Noland | |
| 2004/0120778 A1 | 6/2004 | Lach | |
| 2004/0221696 A1 | 11/2004 | Matsuhashi | |
| 2004/0258491 A1 | 12/2004 | Penkert | |
| 2005/0238451 A1 | 10/2005 | Hartman | |
| 2006/0039818 A1 | 2/2006 | Tsai et al. | |
| 2006/0048615 A1 | 3/2006 | Treige | |
| 2006/0144198 A1 | 7/2006 | Okajima | |
| 2007/0006694 A1 * | 1/2007 | Fujimoto | B23B 27/10 |
| | | | 82/173 |
| 2007/0212177 A1 | 9/2007 | Liu | |
| 2007/0283786 A1 | 12/2007 | Kappmeyer | |
| 2008/0065259 A1 | 3/2008 | Dietrich et al. | |
| 2008/0075618 A1 | 3/2008 | Martin et al. | |
| 2008/0080937 A1 | 4/2008 | Hecht | |

(56) References Cited

U.S. PATENT DOCUMENTS

| | | |
|---|---|---|
| 2008/0253849 A1 | 10/2008 | Yoshinaga |
| 2008/0260479 A1 | 10/2008 | Kammermeier |
| 2008/0260964 A1 | 10/2008 | Bagavath-Singh et al. |
| 2009/0035075 A1 | 2/2009 | Hecht |
| 2009/0035411 A1 | 2/2009 | Seibert et al. |
| 2009/0114628 A1 | 5/2009 | DiGiovanni |
| 2010/0086373 A1 | 4/2010 | Kleiner |
| 2010/0172703 A1 | 7/2010 | Neubold |
| 2010/0242696 A1 | 9/2010 | Digernes |
| 2010/0254772 A1* | 10/2010 | Rozzi .................... B23B 27/10 407/11 |
| 2010/0270757 A1 | 10/2010 | Beckington |
| 2011/0156304 A1 | 6/2011 | Walker et al. |
| 2011/0210096 A1 | 9/2011 | Raji |
| 2011/0266068 A1 | 11/2011 | Eason et al. |
| 2011/0291331 A1 | 12/2011 | Scott |
| 2012/0018924 A1 | 1/2012 | Swanson et al. |
| 2012/0068378 A1 | 3/2012 | Swanson et al. |
| 2012/0070523 A1 | 3/2012 | Swanson et al. |
| 2012/0103701 A1 | 5/2012 | Cho et al. |
| 2012/0135166 A1 | 5/2012 | Berglund |
| 2012/0141215 A1 | 6/2012 | Choi |
| 2012/0183802 A1 | 7/2012 | Bruck |
| 2012/0232857 A1 | 9/2012 | Fisker et al. |
| 2012/0326356 A1 | 12/2012 | Martin |
| 2013/0004680 A1 | 1/2013 | Godfrey |
| 2013/0015596 A1 | 1/2013 | Mozeika et al. |
| 2013/0034399 A1* | 2/2013 | Omagari ................. B23C 5/109 409/136 |
| 2013/0040051 A1 | 2/2013 | Mourou et al. |
| 2013/0059509 A1 | 3/2013 | Deopura et al. |
| 2013/0088364 A1 | 4/2013 | Bittar et al. |
| 2013/0101746 A1 | 4/2013 | Keremes et al. |
| 2013/0105230 A1 | 5/2013 | Brackin et al. |
| 2013/0136868 A1 | 5/2013 | Bruck et al. |
| 2013/0161439 A1 | 6/2013 | Beery et al. |
| 2013/0161442 A1 | 6/2013 | Mannella et al. |
| 2013/0164960 A1 | 6/2013 | Swanson et al. |
| 2013/0170171 A1 | 7/2013 | Wicker et al. |
| 2013/0209600 A1 | 8/2013 | Tow |
| 2013/0220570 A1 | 8/2013 | Sears et al. |
| 2013/0220572 A1 | 8/2013 | Rocco et al. |
| 2013/0221191 A1 | 8/2013 | Sears et al. |
| 2013/0223943 A1 | 8/2013 | Gey et al. |
| 2013/0224423 A1 | 8/2013 | Mikulak et al. |
| 2013/0247475 A1 | 9/2013 | Lind et al. |
| 2013/0248260 A1 | 9/2013 | Ganz |
| 2013/0255346 A1 | 10/2013 | Danby et al. |
| 2013/0277121 A1 | 10/2013 | Stevens et al. |
| 2014/0321931 A1 | 10/2014 | Gey |
| 2015/0042050 A1 | 2/2015 | Haimer |
| 2015/0298221 A1 | 10/2015 | Ach |
| 2015/0367423 A1 | 12/2015 | Voss |
| 2016/0031015 A1 | 2/2016 | Doi |

FOREIGN PATENT DOCUMENTS

| | | | |
|---|---|---|---|
| CN | 1689739 | 11/2005 | |
| CN | 1910003 A | 2/2007 | |
| CN | 101068644 A | 11/2007 | |
| CN | 201579425 U | 9/2010 | |
| CN | 102056696 A | 5/2011 | |
| CN | 102427858 A | 4/2012 | |
| DE | 19730539 | 4/1999 | |
| DE | 19860585 A1 | 7/2000 | |
| DE | 10016464 A1 * | 10/2001 | ............ B23B 27/10 |
| DE | 10336923 | 3/2005 | |
| DE | 102004042775 | 3/2006 | |
| DE | 19901777 B4 | 8/2007 | |
| DE | 102006005401 A1 | 8/2007 | |
| DE | 202010015446 * | 2/2011 | ............ B23C 5/04 |
| EP | 191203 | 8/1986 | |
| EP | 728912 | 8/1996 | |
| EP | 843609 | 9/1999 | |
| EP | 1537930 | 6/2005 | |
| EP | 1534451 | 2/2007 | |
| EP | 2367669 | 9/2011 | |
| EP | 2646185 | 10/2013 | |
| EP | 2646224 | 10/2013 | |
| EP | 2646641 | 10/2013 | |
| EP | 2654412 | 10/2013 | |
| GB | 2500996 | 10/2013 | |
| JP | S61109606 | 5/1986 | |
| JP | H04226826 A | 8/1992 | |
| JP | H0623615 | 2/1994 | |
| JP | H06182613 A | 7/1994 | |
| JP | H08206133 | 8/1996 | |
| JP | H1150254 | 2/1999 | |
| JP | 2002066821 | 3/2002 | |
| JP | 2004216483 | 8/2004 | |
| JP | 2008062369 | 3/2008 | |
| JP | 2008081840 | 4/2008 | |
| JP | 2009006436 | 1/2009 | |
| JP | 2010502460 | 1/2010 | |
| WO | 2005025779 | 10/2005 | |
| WO | WO2007104065 A1 | 9/2007 | |
| WO | WO2007127899 A2 | 11/2007 | |
| WO | 2011135512 | 11/2011 | |
| WO | 2012073099 | 6/2012 | |
| WO | 2012146694 | 11/2012 | |
| WO | 2012071449 | 1/2013 | |
| WO | 2013030064 | 3/2013 | |
| WO | 2013087515 | 6/2013 | |
| WO | 2013124691 | 8/2013 | |
| WO | 2013126981 | 9/2013 | |
| WO | 2013140146 | 9/2013 | |
| WO | 2013112217 | 10/2013 | |
| WO | 2013149659 | 10/2013 | |
| WO | 2013154723 | 10/2013 | |

OTHER PUBLICATIONS

English translation of DE 202010015446 U1, Feb. 2011.*
English translation of DE 10016464 A1, Oct. 2001 (Year: 2001).*
Feb. 12, 2016 Office action (3 months).
Jan. 30, 2017 Office action (3 months).
Apr. 19, 2017 First office action.
Nov. 3, 2016 Final Office Action.
Jun. 30, 2017 Final Office Action.
Jul. 7, 2017 Office action (3 months).
May 17, 2017 First office action.
Apr. 16, 2015 Search Report.
Aug. 2014—Technnologietrends—Mapal.
Aug. 19, 2014 Office Action.
Jul. 21, 2015 Final Office Action.
US 20110097162, Oct. 27, 2015 Office action (3 months).
Kessler, Hillary, Nov. 12, 2015 Final Office Action.
Oct. 24, 2017 First office action.
Nov. 17, 2017 Office action (3 months).
Jul. 26, 2011 International Search Report.
Fundamental Aspects in Maching of Metals with Short and Ultrashort Laser Pulses.
Lasers: Solve Every Task Perfectly, State-of-the-Art Laser Technology.
Oct. 18, 2016 Second Office Action.
Nov. 13, 2013 Second Office Action.
Dec. 27, 2017 First Office Action.
Jan. 12, 2018 Second Office Action.
Feb. 13, 2018 First Office Action.
May 29, 2018 Office Action (non-US).
Jul. 20, 2018 Office Action (non-US).
Jul. 27, 2018 Office action (3 months) (US Only).
Aug. 20, 2018 Foreign OA.
May 3, 2019 Foreign OA K-04401-CN-NP.
May 3, 2019 Foreign OA K-04400-CN-NP.

* cited by examiner

MACHINING TOOL AND METHOD FOR MANUFACTURING A MACHINING TOOL

CLAIM TO PRIORITY

This application is a National entry application of German Application No. 102014207510.6, filed on Apr. 17, 2014, the entire contents of which is incorporated herein by reference.

FIELD OF THE INVENTION

The invention relates to a machining tool, in particular a rotating tool such as a drill or milling tool, which extends in an axial direction and in the area of a tool tip comprises an integrated cooling structure for conducting a coolant. The invention additionally relates to a method for manufacturing a machining tool.

BACKGROUND OF THE INVENTION

Machining tools, in particular drills, usually comprise a clamping shaft extending in the axial direction to which a slotted cutting part connects, which extends up to a front tool tip, in particular a drill bit. In the case of such machining tools, which are also referred to as shank-type tools, recesses, particularly for coolant channels, are often implemented in the interior of the base body, as can be seen in EP 0 843 609 B1, for example.

Introducing cooling structures, e.g. coolant lines, in the area of the tool tip is very complex from a manufacturing point of view. In some cases, coolant outlets cannot be optimally positioned. Furthermore, there are various requirements for coolant/lubrication depending on the material being processed. Minimum quantity lubrication is often employed, which involves applying only small amounts of coolant/lubricant. In some cases, further reduction of coolant consumption is sought. In some applications, contact between coolant and the workpiece is undesired.

SUMMARY OF THE INVENTION

Proceeding from this background, the invention seeks to solve the problem of enabling efficient cooling or lubrication in the area of a tool tip of a machining tool.

The problem is solved according to the invention by a machining tool having the features of Claim 1. The machining tool is in particular a rotating tool, i.e. a machining tool which rotates around a rotational axis during operation. In this particular case it is a drill or milling tool.

The machining tool extends in an axial direction and preferably along a center axis, which in the case of rotating tools at the same time also constitutes the rotational axis. Integrated in the area of the tool tip is a cooling structure, by means of which coolant/lubricant is transported during operation. The cooling structure is designed, at least in sections, as a porous structure or comprises at least one cooling channel, which has a reversing segment so that two channel segments oriented in opposite directions are formed. Both options, which can also be used in combination with one another, allow the coolant/lubricant to be conducted in the area of the tool tip in a targeted, defined manner. The porous structure allows for comparatively extensive cooling/lubrication with only minor escape of coolant. With the aid of the cooling channel routed via a reversing section, targeted cutting areas can be supplied with coolant, resulting in only minor coolant need owing to the targeted orientation.

According to the invention, the machining tool is manufactured with a 3D printing method being employed at least for implementing the cooling structure. In a 3D printing method of this type, the body being manufactured is generally generated coat-by-coat or layer-by-layer, wherein, for the purpose of forming each layer with a specified geometry, powdery material is compacted with the aid of a laser, for example melted or sintered, so that a cohesive body is formed. The powder employed is, for example, metal or ceramic powder which typically has an average grain size ranging between 10 and 50 µm. This special manufacturing method allows highly complex geometries, including in particular the porous structure or the reversing segment of the cooling structure, to be realized without difficulty.

The machining tool generally has at its front end a tool tip, which itself is designed as a cutting element or in the area of which one or more cutting elements are arranged. In the present invention, a tool tip is thus generally understood to mean the frontal end area of the machining tool. The machining tool is preferably designed as a modular carrier tool on which a replaceable cutting element (cutting insert) is attached to a (carrier) base body. According to a preferred variant, the tool tip itself is designed as a replaceable cutting insert. This component can be reversibly and replaceably attached to the base body by way of by way of clamping, for example with the aid of fastening elements such as screws, or alternatively by means of simple twisting. For this purpose, this component is held clamped in particular between two retaining or clamping webs of the base body. The carrier tool is alternatively designed with plate seats for attaching (indexable) inserts. In this case the area of the plate seats is understood to mean the tool tip. In a non-modular, one-piece tool having, for example, major cutting edges cut into the end face area, a front end face area having an axial length, for example in the range of a nominal diameter, constitutes tool tip.

In the present invention, a porous structure is generally understood to mean a non-solid structure having a plurality of pores, i.e. air or gas inclusions, or also having a plurality of (micro-) channels, for example in the manner of a honeycomb structure or also a bionic, random structure. It is an open, in particular open-pored, pore structure, in which at least some of the individual pores are connected to one another so that, overall, channels are formed, and the entire pore structure is suitable for conducting coolant.

The porous structure expediently has a porosity ranging between 5 and 90%, i.e. 5 to 90 percent of the porous structure is composed of pores, i.e. air inclusions. In spite of this comparatively large pore volume, sufficiently high stability is still ensured. The pores preferably have an average pore size ranging between 15 and 45 µm.

It is possible in principle to combine different structures with one another within the machining tool, and also to vary the structure within a section, i.e. change the porosity for example.

With regard to the porous structure, an outlet point is expediently provided at an outer cladding in the area of the tool tip, i.e. the porous structure protrudes to the outside and is not closed. This results in the special advantage that coolant can be conducted outward via the porous structure across as large a surface area as possible, even in small quantities, and optimally effective cooling or lubrication of large surface areas can be ensured at the same time. Unlike with coolant bores, only very small quantities escape per surface segment. In particular, the coolant feed is set such that the surfaces are virtually just wetted.

The outlet point is thus expediently a planar outlet point.

According to a first variant, the outlet point is located on a radially outer circumferential wall, in particular at what is referred to as the drill back. A coolant or lubricant can thus be introduced in a targeted manner via this outlet point into the area between the circumference of the machining tool and the workpiece being machined, in particular a borehole wall.

In an alternative variant, the outlet point is designed in a chip flute wall of a chip flute. A large-surface-area outlet point in particular facilitates highly efficient cooling of, for example, a chip to be transported away. The surface of the chip flute, i.e. the chip flute wall, is hereby efficiently cooled.

Finally, it is provided in a third variant that the outlet point is formed at the end face of a front end face, which is formed succeeding a major cutting edge against the direction of rotation.

The different variants for the outlet point can thus be arbitrarily combined with one another. Different porosities with differently sized pores can also be created, so that—at the same coolant pressure—different volumes of coolant/lubricant can be deliberately supplied at the individual outlet point via the differently designed porous structures.

In the embodiment variant with the cooling channel having a reversing segment, said cooling channel expediently has a channel outlet, which is purposefully oriented in the direction of a cutting element, in particular a cutting insert. The cutting insert is preferably a reversibly changeable cutting insert, in particular a cutting plate, preferably an indexable insert. In this embodiment variant, the channel outlet is thus directed at a plate seat. Alternatively, the cutting element is a tool tip designed as an insert or merely an cut-in cutting edge. Particularly in the case of modular carrier tools, the cutting elements are often oriented such that they can be satisfactorily cooled only conditionally with conventional coolant outlet boreholes. The possibility created by the 3D-printing method of also realizing structures having a reversing segment, so that a coolant segment is routed back in the reverse direction, facilitates good cooling of cutting elements of this kind as well.

For this purpose, the reversing segment expediently has a roughly U-shaped curved design; in particular, the channel outlet is thus oriented rearward. The cooling channel thus comprises in particular two channel segments routed anti-parallel in relation to one another.

In an expedient embodiment, a closed coolant circuit is provided, so that the entry and outlet point of the cooling channel, i.e. the openings of the individual cooling channel segments, are both routed to a shared interface via which the coolant/lubricant is supplied and removed again. In the case of a one-piece, monolithic machining tool, the two cooling channel segments are routed completely to a rear coolant feed point.

In an especially expedient refinement, the channel outlet is elongated, in particular curved and preferably annular. It alternatively has multiple channel outlets for this purpose, which are directed at a cutting element. The elongated, roughly slit-shaped embodiment allows a comparatively extensive area to be effectively supplied with coolant or lubricant. The same is also true for the embodiment in which multiple channel outlets are directed at a single cutting element, for example at a plate seat.

BRIEF DESCRIPTION OF THE DRAWINGS

Exemplary embodiments of the invention are described hereafter in greater detail based on the figures, each of which shows a partly schematic illustration.

Parts having the same effect are given the same reference numbers in the figures.

DETAILED DESCRIPTION OF THE INVENTION

Figure 1:
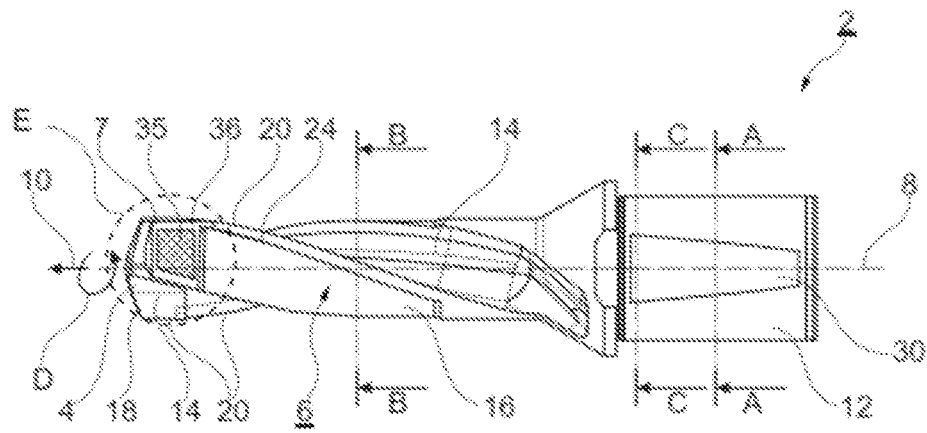
FIG. 1 shows a side view of a machining tool designed as a modular carrier tool.
Figure 2:
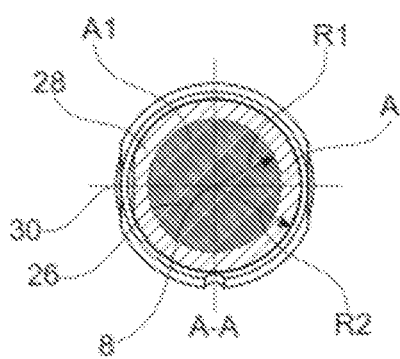
FIG. 2 shows a sectional view through the machining tool as shown in FIG. 1 along intersecting line A-A.
Figure 3:
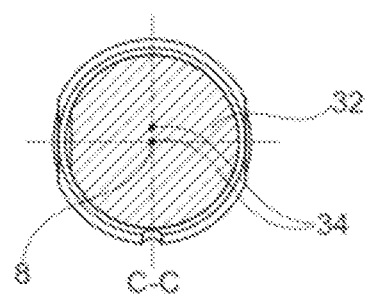
FIG. 3 shows a sectional view through the machining tool as shown in FIG. 1 along intersecting line C-C.

The machining tool 2 illustrated in FIG. 1 is designed as a modular drill tool. It has a tool tip 4 in the form of a cutting element made of solid carbide or ceramic, which is reversibly and replaceably attached to the frontal end of a base body 6. In the present invention, a tool tip is generally understood to mean the frontal end area of the machining tool 2, i.e. a front end face area of the machining tool. In the exemplary embodiment according to FIG. 1, this is formed by the replaceable tool tip 4. In the case of a carrier tool having plate seats for attaching (indexable) inserts as cutting element, the area of the plate seat is understood to mean the tool tip. In a non-modular, one-piece tool, a front end area having an axial length, for example, in the range of a nominal diameter of the machining tool 2 is referred to as the tool tip. In the exemplary embodiment according to FIG. 1, the tool tip 4 is clamped as a reversibly replaceable insert between two clamping or retaining webs 7 of the base body 6.

The machining tool 2, and thus also the base body 6, as well as the tool tip 4 each extend in an axial direction 10 along a center axis 8 from a rearward end to a front end. At the same time, this center axis 8 defines a rotational axis around which the machining tool rotates in a rotational direction D during operation.

The base body 6 is in turn divided into a rear shaft part 12, with which the machining tool 2 is held clamped in a tensioning piece of a machine tool during operation. A cutting part 16 provided with chip flutes 14 adjoins the shaft part 12 in the axial direction 10. In the exemplary embodiment, the chip flutes 14 extend in a helical pattern. The end-face tool tip 4 has major cutting edges 18, each of which typically transitions into a minor cutting edge 20 on the circumferential side. These are continued in the cutting part 16.

A support bevel 24 adjoins the minor cutting edge 20 opposite the direction of rotation.

As is described below based on FIGS. 2 through 5, the base body 6 is a monolithic base body 6, which is formed not from a solid material, but rather—at least in axial sections—has a non-solid core structure 26. As FIG. 2 in particular illustrates, this core structure is designed as a circular structure in the shaft part 12, as seen in the cross-sectional view. The core structure 26 in this shaft part 12 is preferably designed to have a constant radius $R_1$. It preferably extends at least nearly over the entire length of the shaft part 12 in the manner of a cylinder. This cylindrical core structure 26 is surrounded by an outer jacket 28, which, except for a flattening 30 introduced externally, is designed as an annular ring. The outer jacket 28 has a radius $R_2$. The radius $R_1$ of the core structure 26 is preferably around 50 to 90% of the outer radius $R_2$. The core structure 26 has a core cross-sectional area A1, and the machining tool 2 has a total cross-sectional area A2. This area is defined by the area enclosed by the outer jacket 28, including the surface of the outer jacket 28.

At the rearward end of the shaft part 12, the same is optionally closed off with an end face plate formed of a solid material, i.e. the non-solid core structure 26 is formed only in the interior of the shaft part 12, without being visible from the rearward end face. A coolant transfer point is expediently formed and incorporated in this solid end face plate. In particular, a transverse groove having through-holes running to the core structure 26 is introduced.

In the exemplary embodiment, the core structure 26 is limited, in a similar manner, also in axial direction 10 in the end area of the shaft part 12 by a solid partition 32 through which at least one, or in the exemplary example two, cut-outs 34 penetrate. Alternatively, the core structure 26 also spans from the shaft part 12 into the cutting part 6 uninterrupted and without partition 32. A partition 32 is provided particularly in machining tools 2 without internal coolant supply. However, coolant supply is, in principle, made possible via the cut-outs 34 in the cutting part 16.

In the front area of the machining tool 2, i.e. in the area of the tool tip 4, at least one outlet point 35 for coolant or lubricant is provided. Multiple outlet points 35, which are oriented for example toward cutting areas, are preferably formed in a front end face or are also formed circumferentially. The outlet point 35 can be designed in a conventional manner as a borehole. However, it is likewise preferably created by means of the 3D printing method and is geometrically complex. The core structure 26 is preferably led to the outside to form the outlet point 35. In the exemplary embodiment illustrated in FIG. 1, an outlet point 35 is formed, for example, in a circumferential wall 36 in the area of the tool tip and particularly as a porous structure. The outlet point 35 in the exemplary embodiment is thus generally integrated into the retaining webs 7.

Figure 4:
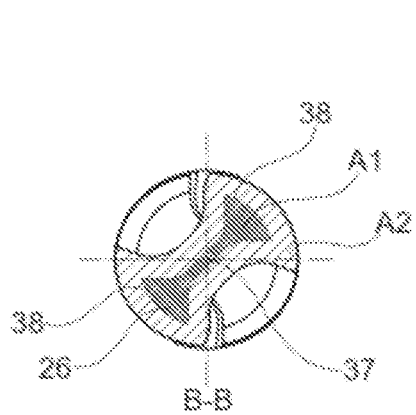
FIG. 4 shows a sectional view through the machining tool along intersecting line B-B.

The core structure 26 continues into the cutting part 16 itself (FIG. 4). Owing to the chip flutes 14 and the thereby modified circumferential geometry of the base body 6, the cross-sectional geometry of the core structure 26 is adapted in particular such that it is enveloped entirely by roughly the same wall thickness of the outer jacket 28. In particular, the core structure 26 is designed to be elongated in the cutting part 16 and has a center area 37, which transitions into widened areas 38 at both ends. The outer edge of each said widened area has an arcuate contour, so that the widened area run concentrically to the circumferential line of the base body 6.

The core structure 26 is preferably homogeneous and even over its entire cross sectional area A1. Alternatively, additional supports can be provided in a manner not further illustrated here. Separate coolant channels are expediently not formed in the embodiment variants of FIG. 1.

Figure 5:
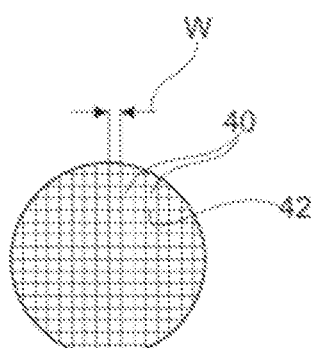
FIG. 5 shows a sectional illustration of a grid-shaped core structure.

According to a first embodiment variant, the core structure 26 is designed as a porous structure. According to a second embodiment variant illustrated in FIG. 5, the core structure 26, is, in contrast, designed as a grid-like, in particular honeycomb-shaped, structure. This structure has a plurality of individual channels 40 extending in the axial direction 10. Rectangular channels are schematically illustrated in FIG. 5. The individual channels 40 are each separated from one another by dividing walls 42. These dividing walls 42 preferably have only a low material thickness of, for example, below 0.3 and, particularly, below 0.15 mm. The individual channels 40 have a channel width W of usually below 0.5 mm.

The base body 6 is manufactured using what is referred to as a 3D printing method. In this method, a metal powder is worked successively and thus layer-by-layer by means of laser treatment according to the desired cross-sectional geometry of each layer and melted or sintered to form a cohesive, monolithic sub-body. In this process, each cross-sectional contour of each layer is predefined by the laser. With this 3D printing method, nearly any arbitrary as well as complex and, in particular, variable cross-sectional geometries can be realized. In particular, the core structure 26 described for FIGS. 2 through 5 and having the solid enveloping outer jacket 28 is realized using this method. The entire base body 6 is thus realized as a one-piece, monolithic body by means of this manufacturing method. This body can also undergo finishing work following the 3D printing process.

The base body 6 is preferably made of a tool steel according to DIN EN 10027, for example with a material number 1.2709 and/or 1.2344.

Figure 6:
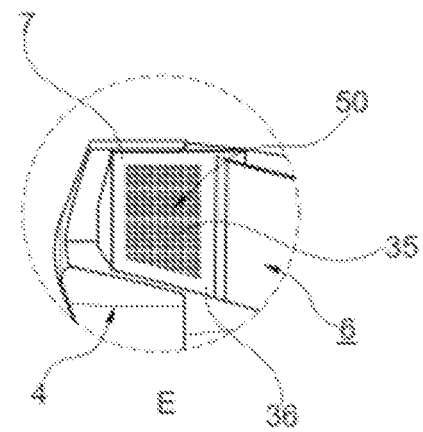
FIG. 6 shows an enlarged illustration of the area of the tool tip demarcated by a circle "E" in FIG. 1.

As is apparent in particular from FIG. 6 in conjunction with FIG. 1, the machining tool 2 in the area of the tool tip 4 has a cooling structure 4 which, in the embodiment variant according to FIG. 6, is designed as a planar, porous structure 50. This structure is led from inside to outside and forms the outlet point 35 in the circumferential wall 36 forming a drill back. This circumferential wall 36 thus forms an outer cladding. As FIG. 6 shows, the outlet point 35 extends over a large portion of the circumferential wall 36 and is planar. Viewed in the circumferential direction, the outlet point 35 thus extends for example over 40 to 80% of the available area between the minor cutting edge 20 and the succeeding chip flute 14. The circumferential wall 36 extends in the circumferential direction between these two elements. The porous structure 50 and thus the outlet point 35 also extend in the axial direction 10 over a large axial length of the circumferential wall 36, for example in turn over an axial length which corresponds to 0.25 to 4 times the nominal diameter of the machining tool 2.

Figure 7:
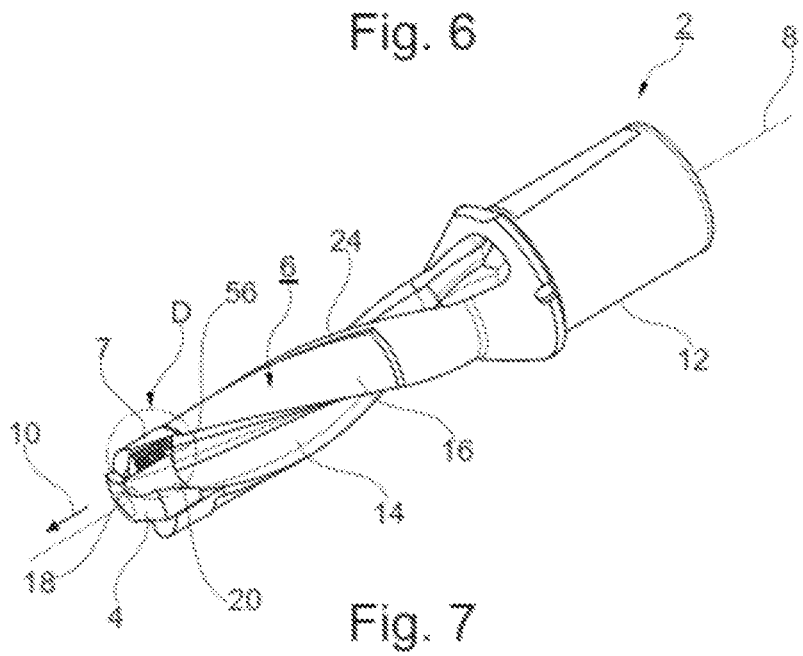
FIG. 7 shows a perspective illustration of a machining tool.
Figure 8:
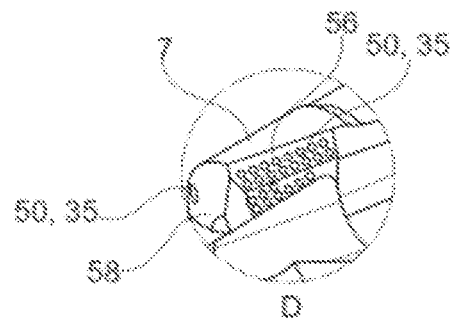
FIG. 8 shows an enlarged illustration of the area of the tool tip identified with a circle "D" in FIG. 7.

Alternatively or additionally, a porous structure of this type having an outlet point 35 is also formed in the area of a chip flute wall 56 of the chip flute 14, as is illustrated in FIGS. 7 and 8. In this case as well, the outlet point 35 has a large-surface-area design. It extends preferably over 10 to 100% of the axial length of the tool tip 4 or is, for example, between 30 and 100% of the nominal diameter of the machining tool 2. If needed, the porous structure 50 can also be formed in the base body 6 in the chip flute wall 56 or on the circumferential wall 36. It is also apparent particularly from FIG. 8 that the outlet point 5 extends within the chip flute 14 over a comparatively large arc segment of the chip flute 14 and covers, for example, between 10 and 60% of the chip flute wall 56 in the circumferential direction of the chip flute 14. In the exemplary embodiment, the outlet point 35 is formed at the end of the chip flute 14 opposite the minor cutting edge 20, preferably in the retaining web 7.

Like in the exemplary embodiment shown in FIG. 1, in the exemplary embodiment shown in FIG. 7 the base body 6 has two opposite retaining webs 7 designed as clamping webs between which the tool tip 4 is clamped as cutting insert. The tool tip 4 is reversibly replaceable and is preferably held between the two retaining webs 57 solely by way of a clamping force. The cooling structure is generally integrated in particular in these retaining webs 7, and the at least one outlet point 35 is formed on these retaining webs 7.

Finally, FIG. 8 shows an additional third outlet point 35 in an end face 58, which allows coolant to exit immediately in the area near the major cutting edges. As FIG. 7, for example, shows, this end face 58 is slightly recessed compared to the tool tip 4 that is employed. In the exemplary embodiment, this end face 58 is formed in the lateral retaining webs 7.

The porous structure 50 is connected in particular to the porous core structure 26 via which it is supplied with coolant/lubricant during operation. The two structures 50, 26 expediently differ in terms of, for example, their porosity or also in terms of pore size, etc. Within the core structure 26, variation can also be provided by having different structures in the shaft area and in the cutting area.

Figure 9:
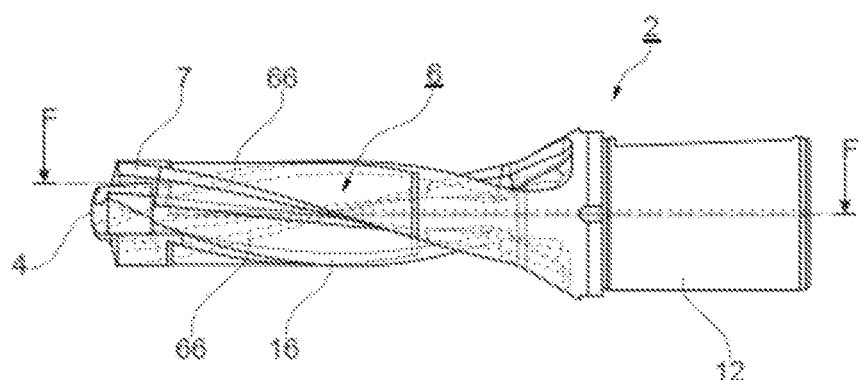
FIG. 9 shows a side view of a further machining tool.
Figure 10:
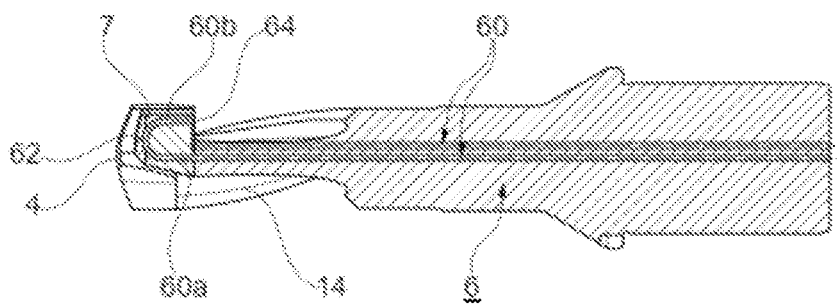
FIG. 10 shows a sectional view of the machining tool according to FIG. 9 along the intersecting line F-F.

FIGS. 9 and 10 finally illustrate a further exemplary embodiment in which, instead of the porous structure 50 as the cooling structure in the tool tip, multiple cooling channels 60 are formed, which are bent in the shape of a U in the area of the tool tip 4 and comprise a reversing segment 62. The cooling channel 60 thus comprises two channel segments 60a, 60b that run virtually antiparallel to one another. In the exemplary embodiment, the one channel segment 60 ends at a channel outlet 64 which is directed away from the front end of the machining tool 2. The other channel segment 60a is routed in the base body 6 to a coolant interface up to a rear end in the area of the shaft part 12, and in particular in a straight line or parallel or coaxial in relation to the center axis 8. The reversing segment 62 is in turn integrated into the respective retaining web 7. In the exemplary embodiments shown, conventional further cooling channels 66 are additionally provided (FIG. 9), which run in a helical pattern in the base body 6 and exit at the end face 58 or in the chip flute 14, for example.

The channel outlet 64 is preferably directed at a cutting element not illustrated in greater detail here. The cutting element is in particular a replaceable cutting plate. During operation, the coolant exiting the channel outlet 64 thus deliberately reaches the cutting element. Elongating an imaginary longitudinal axis of the channel segment 60b in front of the channel outlet 64 thus intersects in particular the edge of the cutting element.

As an alternative to this embodiment variant having the channel outlet 64, it is also possible to form a closed cooling circuit. For this purpose, the second channel segment 60b would then also be routed back to the rear coolant interface at the end portion of the shaft part 12. In this embodiment variant as well, the cooling channels 60 are designed with the reversing segment 62 in the respective clamping web of the base body 6.

What is claimed is:

1. A machining tool that extends in an axial direction along a rotational axis and comprising:
    a tool tip;
    a base body, the base body forming retaining webs between which a tool tip can be inserted and having an integrated cooling structure for conducting a coolant or lubricant, the cooling structure being integrated at least partly in the retaining webs; and
    a chip flute formed in the base body, the chip flute having a chip flute wall,
    wherein the cooling structure, at least in sections, is designed as a porous structure having a plurality of pores;
    wherein at least a portion of the porous structure is located in the retaining webs of the base body and the porous structure exits at an outlet point provided on the chip flute wall; and
    wherein the porous structure has a porosity ranging between 5% and 90%.

2. The machining tool as claimed in claim 1, further comprising an outer cladding at which the porous structure exits at the outlet point.

3. The machining tool as claimed in claim 1, wherein the outlet point is a planar outlet point.

4. A method for manufacturing a machining tool as claimed in claim 1, wherein the machining tool is manufactured with an integrated cooling structure at least partially with the aid of a 3D printing method.

5. The machining tool as claimed in claim 1, wherein the pores have an average pore size ranging between 15 and 45 µm.

6. The machining tool as claimed in claim 1, wherein the pores of the porous structure are arranged in a honeycomb structure.

7. The machining tool as claimed in claim 1, wherein the pores of the porous structure are arranged in a bionic, random structure.

\* \* \* \* \*